United States Patent Office 3,040,043
Patented June 19, 1962

3,040,043
3-TRIFLUOROMETHYL - 10 - [3'-(4''-(2''''-HYDROXYETHYL) - HOMOPIPERAZINO)-PROPYL]-PHENOTHIAZINE AND 3-TRIFLUOROMETHYL-10-[3'-(4''-(2''''-ACETOXYETHYL) - HOMOPIPERAZINO)-PROPYL]-PHENOTHIAZINE
Wilhelm Alfons Schuler, Bad Homburg vor der Hohe, Helmut Beschke, Frankfurt am Main, and Ansgar von Schlichtegroll, Bad Homburg vor der Hohe, Germany, assignors to Deutsche Gold- und Silber-Scheideanstalt vormals Roessler, Frankfurt am Main, Germany
No Drawing. Filed Mar. 14, 1960, Ser. No. 14,548
Claims priority, application Germany Mar. 18, 1959
2 Claims. (Cl. 260—243)

The present invention relates to novel homopiperazino compounds of the general formulae

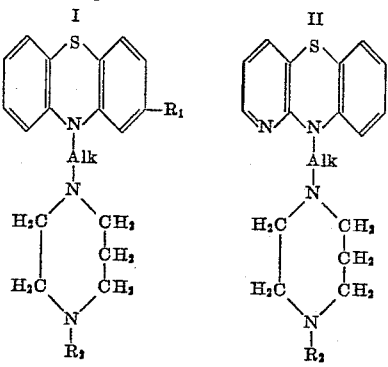

in which $R_1$ signifies hydrogen, chlorine, bromine, methoxy, trihalogen methyl or acetyl; Alk signifies a straight or branch chained lower alkylene chain and $R_2$ a lower alkyl group, preferably a methyl group, a hydroxy alkyl group or an acyl oxy alkyl group. The novel compounds according to the invention have excellent pharmaceutical action and particularly among other actions have a strong antiemetic and sedative effect.

The compounds according to the invention can be prepared by reacting a secondary phenothiazine or azaphenothiazine with a compound of the general formula

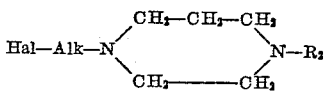

in which Hal represents a halogen atom and Alk and $R_2$ have the same significance as above in the presence of agents promoting splitting off of halogen.

Such compounds furthermore may be prepared by heating a compound of the general formula

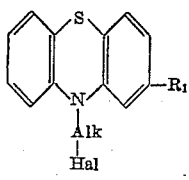

or

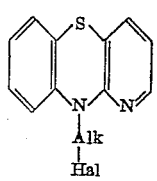

together with a compound of the general formula

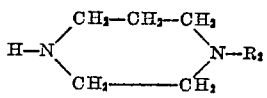

In addition, such compounds may be prepared by reacting at elevated temperature a compound of the general formula

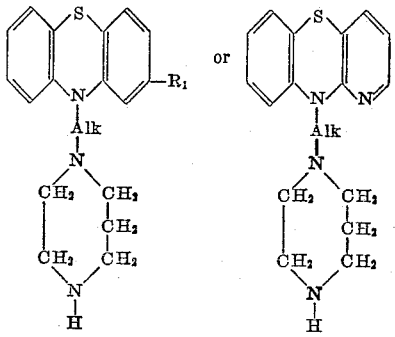

with an alkyl ester, preferably an alkyl halide or an alkyl sulfate or a halogen alcohol such as ethylene chlorohydrin or an acylated halogen alcohol. The novel compounds according to the invention can be converted to their salts or their quaternary ammonium derivatives.

The following examples will serve to illustrate several embodiments of the invention. In such examples the proportions are given in part by weight unless otherwise indicated.

Example 1

10.8 parts of 3-chlorophenothiazine were boiled in 90 parts benzene under reflux with 4.4 parts of a 50% $NaH_2$ benzene suspension for 30 minutes. Thereafter, 11 parts of N-methyl-N'-3-bromopropyl-homopiperazine dissolved in 40 parts of benzene were dropped in over a period of 30 minutes. The mixture was then boiled for 4 hours with stirring. After the reaction mixture had cooled down it was poured into water and the resulting benzene layer extracted with dilute HCl at a pH of 5 and the aqueous HCl containing layer then alkalized with concentrated NaOH and extracted with ether. The ether extract was distilled after drying with potash. 9.2 parts of methyl-homopiperazino-n-propyl - 3 - chlorophenothiazine distilled over at 210–220° C. at 1 mm. Hg pressure. This product was then taken up in isopropanol and the dihydrochloride precipitated therefrom by addition of isopropanolic HCl. After recrystallization from ispropanol the melting point of the dihydrochloride was 232–234° C.

Example 2

14 parts of chlorophenothiazine in 100 parts of benzene were reacted as in Example 1 with 5.6 parts of a 50% $NaNH_2$ benzene suspension. Then 13.5 parts of 3-bromopropyl homopiperazine dissolved in 50 parts of benzene were dropped in over a period of 30 minutes. The mixture was then boiled under reflux for 4 hours with stirring and the reaction mixture after cooling then processed as in Example 1. 12.1 parts of homopiperazino-n-propyl-chlorophenothiazine distilled over at 245–255° C. at 3 mm. Hg pressure.

7 parts of this base were boiled under reflux in 100 parts butanol, together with 1.82 parts of ethylene chlorohydrin and 5.2 parts finely divided potash for 6 hours. The reaction mixture was then washed with water, extracted with dilute HCl. The extract was alkalized and extracted with ether and the ether extract distilled. 5.3 parts of hydroxyethyl-homopiperazino-n-propyl chlorophenothiazine distilled over at 265–273° C. at 2 mm. Hg pressure. The nitrogen content of the base was found titrimetrically to be 100.5% of the theoretical.

Example 3

27 parts of 3-chloro-10-(3'-chloropropyl)-phenothiazine were warmed together with 45 parts of 1-methyl-homopiperazine for 5 hours at 180° C. The reaction product was extracted with ether and the ether extract extracted with dilute HCl. The resulting HCl solution was alkalized with concentrated NaOH and extracted with ether. 31.5 parts of crude methyl-homopiperazino-n-propyl-chlorophenothiazine were obtained upon evaporation of the ether from such extract. This, analogously to Example 1, was converted to the dihydrochloride of a melting point of 232–234° C.

*Example 4*

10.3 parts of 4-azaphenothiazine in 60 parts of toluene were reacted with 2.5 parts of soda amide. 12.2 parts of N-methyl-N'-(3-bromopropyl)-homopiperazine dissolved in 50 parts of toluene were dropped into the resulting suspension. After refluxing for 3 hours the reaction mixture was washed with water twice and then extracted with dilute HCl, the resulting extract alkalized with an excess of potassium carbonate and the precipitated base taken up in ether. After drying the ether extract and evaporation of the ether, the residue was distilled under a vacuum of 0.8 mm. Hg. The reaction product distilled over at 210–215° C. 5.5 parts of 4-aza-10-[3'-(4''-methyl-homopiperazine)-propyl]-phenothiazine were obtained.

*Example 5*

35 parts of 3-trifluoromethyl-phenothiazine in 200 parts of toluene were reacted with 6.1 parts soda amide and then with 28.8 parts of 3-bromopropyl-homopiperazine. After a 2 hours' reaction period the reaction mixture was processed as in Example 4. 20.3 parts of 3-trifluoromethyl - 10 - (3' - homopiperazino) - propyl - phenothiazine having a boiling point of 225–230° C. at 1 mm. Hg pressure were obtained.

*Example 6*

20 parts of 3-trifluoromethyl-10-(3'-homopiperazino)-propyl-phenothiazine in 100 parts of butanol were refluxed for 4 hours together with 5.5 parts of 2-chloroethanol and 11 parts potassium carbonate. The reaction mixture was diluted with 200 parts of ether, then washed three times with water and dried with potassium carbonate. After evaporation of the solvent the residue was distilled under a vacuum of 1 mm. Hg. 17.5 parts of 3-trifluoromethyl-10-[3'-(4''-(2'''-hydroxy ethyl)-homopiperazino)-propyl]-phenothiazine distilled over at 230–240° C. The difumarate of this base had a melting point of 148° C.

*Example 7*

10 parts of 3-trifluoromethyl-10-[3''-(4''-(2'''-hydroxyethyl)-homopiperazino)-propyl]-phenothiazine were reacted in 10 parts of benzene with 10 parts of pyridine and 4.3 parts of acetic acid anyhdride. After 24 hours the reaction mixture was diluted with 50 parts of benzene, and then first shaken out with dilute NaOH and then twice with water. Upon evaporation of the benzene from the benzene solution 3-trifluoromethyl-10-[3'-(4''-(2'''-acetoxyethyl) - homopiperazino) - propyl] - phenothiazine was recovered. Its difumarate melted at 165–167° C.

*Example 8*

13.4 parts of 3-trifluoromethyl-phenothiazine in 100 parts of toluene were reacted with 2.3 parts of soda amide, and 11.7 parts of N-methyl-N'-(3-bromopropyl)-homopiperazine as described in Example 4 and the reaction mixture processed as in Example 4. 7 parts of 3-trifluoromethyl - 10 - [3' - (4'' - methyl - homopiperazino) - propyl]-phenothiazine boiling at 215° C. at 0.5 mm. Hg were obtained.

The mentioned homopiperazino derivatives are unexpectedly potent musculotropic antispasmodics with a favourable therapeutic ratio.

The experiments on the isolated guinea pig ileum (90–100% relaxation of the $BaCl_2$ contraction, method as described in Arzneimittelforschung 7, 237–252, 1957) with these compounds resulting in a multiple of the activity of papaverine. The hydroxy-ethyl-homopiperazino-propyl-chlorophenthiazine-derivative for example was about 7 times as effective concerning musculotropic antispasmodic activity as papaverine; the homopiperazino-propyl-chlorophenthiazine-derivative was more than 30 times as effective as papaverine and the methyl-homopiperazino-propyl-azaphenthiazine-derivative was about 7 times as effective as papaverine with regard to musculotropic antispasmodic activity.

Furthermore the mentioned homo-piperazino-derivatives are as well especially suitable as sedatives and psychodrugs with a good compatability:

The ED 50 for the inhibition of the motility of mice after oral application was 5 mg./kg. for the methyl-homopiperazino-propyl-chlorophenthiazine-derivative, about 4 mg./kg. for the acetoxy-ethyl-homopiperazino-propyl-trifluor-methyl-phenthiazine-derivative and 2.5 mg./kg. for the hydroxy-ethyl-homopiperazino-propyl-trifluor-methyl-phenthiazine-derivative.

The motility of the mice was measured in the selenium cell apparatus (method as described in Arzneimittelforschung 7, 237–252, 1957).

We claim:

1. 3 - trifluoromethyl - 10 - [3' - (4'' - (2''' - hydroxy ethyl)-homopiperazino)-propyl]-phenothiazine.

2. 3 - trifluoromethyl - 10 - [3' - (4'' - (2''' - acetoxyethyl)-homopiperazino)-propyl]-phenothiazine.

References Cited in the file of this patent

UNITED STATES PATENTS

| | | |
|---|---|---|
| 2,766,235 | Cusic | Oct. 9, 1956 |
| 2,838,507 | Cusic | June 10, 1958 |
| 2,921,069 | Ullyot | Jan. 12, 1960 |
| 2,943,086 | Yale et al. | June 28, 1960 |

FOREIGN PATENTS

| | | |
|---|---|---|
| 1,167,633 | France | Aug. 18, 1958 |
| 797,061 | Great Britain | June 25, 1958 |
| 782,431 | Great Britain | Sept. 4, 1957 |
| 203,502 | Austria | May 25, 1959 |

OTHER REFERENCES

Abstract of Australian patent application 43,797/58 (open to public inspection in Patent Office library—June 4, 1959).

Von Schlichtegroll Arzneimittel Forsch., vol 7, pages 237 to 252 (1957).

Richter's Organic Chemistry, vol. 3, pages 3 to 4 (1923), P. Blakiston's Sons and Co.